(12) United States Patent
Pietraski et al.

(10) Patent No.: US 7,561,615 B2
(45) Date of Patent: Jul. 14, 2009

(54) METHOD AND APPARATUS FOR COMPENSATING FOR PHASE NOISE OF SYMBOLS SPREAD WITH A LONG SPREADING CODE

(75) Inventors: Philip J. Pietraski, Huntington Station, NY (US); Mihaela Beluri, Glen Cove, NY (US); Rui Yang, Greenlawn, NY (US); Amith Vikram Chincholi, West Babylon, NY (US); Kenneth P. Kearney, Smithtown, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 645 days.

(21) Appl. No.: 11/301,198

(22) Filed: Dec. 12, 2005

(65) Prior Publication Data

US 2006/0209933 A1  Sep. 21, 2006

Related U.S. Application Data

(60) Provisional application No. 60/665,122, filed on Mar. 25, 2005, provisional application No. 60/663,874, filed on Mar. 21, 2005, provisional application No. 60/662,976, filed on Mar. 18, 2005.

(51) Int. Cl.
  *H04B 1/69* (2006.01)
  *H04B 7/216* (2006.01)
(52) U.S. Cl. .......................... 375/148; 370/342
(58) Field of Classification Search .............. 375/148, 375/130, 147, 149, 349, 347; 370/320, 335, 370/342; 455/62, 69, 103
  See application file for complete search history.

(56) References Cited

U.S. PATENT DOCUMENTS

| | | | |
|---|---|---|---|
| 5,696,762 A | 12/1997 | Natali et al. | |
| 5,898,665 A | 4/1999 | Sawahashi et al. | |
| 5,966,370 A | 10/1999 | Gunzelmann | |
| 6,078,573 A | 6/2000 | Batalama et al. | |
| 6,249,517 B1 | 6/2001 | Roh et al. | |
| 6,483,867 B1 | 11/2002 | Mannermaa | |
| 7,006,475 B1 * | 2/2006 | Suzuki et al. | 370/335 |
| 7,212,578 B2 * | 5/2007 | Lee et al. | 375/267 |

(Continued)

FOREIGN PATENT DOCUMENTS

EP  0 945 994  9/1999

(Continued)

*Primary Examiner*—Khai Tran
(74) *Attorney, Agent, or Firm*—Volpe and Koenig PC

(57) ABSTRACT

A method and apparatus for compensating for phase noise of symbols spread with a long spreading code are disclosed. To compensate for the phase noise, a phase error estimate is generated from despread symbols with a short spreading code. A phase correcting phasor is applied to chip rate data before despreading the data with a long spreading code. A signal-to-interference ratio (SIR) on a common pilot channel (CPICH) may be calculated by spreading the data with a parent spreading code in an orthogonal variable spreading factor (OVSF) code tree and by combining symbols. Alternatively, a magnitude of the symbols may be used in estimating the SIR. The SIR of a channel using a short spreading code and an SIR of a channel using a long spreading code are measured. The SIR of the channel with the long spreading code may be compensated in accordance with a difference between degradation of the SIRs.

35 Claims, 3 Drawing Sheets

U.S. PATENT DOCUMENTS

| | | |
|---|---|---|
| 7,372,892 B2 * | 5/2008 | Li .............................. 375/147 |
| 2003/0169707 A1 | 9/2003 | Usuda et al. |
| 2003/0235238 A1 | 12/2003 | Schelm et al. |
| 2007/0072552 A1 * | 3/2007 | Jonsson et al. ........... 455/67.11 |

FOREIGN PATENT DOCUMENTS

| | | |
|---|---|---|
| EP | 1 229 678 | 8/2002 |
| EP | 1 361 669 | 11/2003 |
| EP | 1 447 917 | 8/2004 |

* cited by examiner

US 7,561,615 B2

METHOD AND APPARATUS FOR COMPENSATING FOR PHASE NOISE OF SYMBOLS SPREAD WITH A LONG SPREADING CODE

CROSS REFERENCE TO RELATED APPLICATIONS

This application claims the benefit of U.S. Provisional Application Nos. 60/662,976 filed Mar. 18, 2005, 60/663,874 filed Mar. 21, 2005 and 60/665,122 filed Mar. 25, 2005, which are incorporated by reference as if fully set forth.

FIELD OF INVENTION

The present invention is related to a code division multiple access (CDMA) wireless communication system. More particularly, the present invention is related to a method and apparatus for compensating for phase noise of symbols having a long spreading code.

BACKGROUND

In a CDMA system employing different lengths of spreading codes, receiver imperfections, such as phase noise, may degrade transmissions more when using a longer spreading code than using a shorter spreading code if the nature of the imperfections is time-varying, such as phase noise on the scale of the spreading code length. For example, in a universal mobile telecommunication system (UMTS) frequency division duplex (FDD) system, the spreading codes may vary from 4 to 512 chips.

In a third generation (3G) high speed downlink packet access (HSDPA) system, adaptive coding and modulation (AMC) is based on a channel quality indication (CQI) estimated by a wireless transmit/receive unit (WTRU). The CQI is expected to reflect the channel quality of the high speed physical downlink shared channel (HS-PDSCH), which uses a spreading factor (SF) of 16. However, the CQI is generated based on a signal-to-interference ratio (SIR) measured on a common pilot channel (CPICH), which has an SF of 256. In an ideal radio environment, this does not present a problem because different processing gains due to different SFs are easily factored into the CQI generation. However, phase noise can impact the SIR measurements made on signals of different SFs by different amounts. Therefore, the CQI measurement based on the CPICH may not reflect the channel quality seen by the HS-PDSCH.

SUMMARY

The present invention is related to a method and apparatus for compensating for phase noise of symbols having a long spreading code. In order to compensate the phase noise, a phase error estimate is generated from the despread symbols with a short spreading code. The phase correcting phasor generated from the phase error estimate is applied to the chip rate data and then the phase corrected data with long spreading codes is despread. A SIR on a CPICH may be calculated by despreading the chip rate data with a spreading code which is a parent code of a spreading code of a CPICH in an orthogonal variable spreading factor (OVSF) code tree and by combining symbols. Alternatively, a magnitude of the CPICH symbols may be used in estimating the SIR. The SIR of a channel using a short spreading code and an SIR of a channel using a long spreading code are measured. The SIR of the channel using the long spreading code may be compensated in accordance with a difference between degradation of the SIR on the channels.

DETAILED DESCRIPTION OF THE PREFERRED EMBODIMENTS

The features of the present invention may be incorporated into an integrated circuit (IC) or be configured in a circuit comprising a multitude of interconnecting components.

The present invention is applicable to any wireless communication system including, but not limited to, a third generation partnership project (3GPP) system. The present invention will be explained with reference to a CPICH and an HS-PDSCH hereinafter. However, it should be noted that the reference to the CPICH and the HS-PDSCH is for illustration of the present invention and the present invention may be applied to any other channel using any SF.

Figure 1:
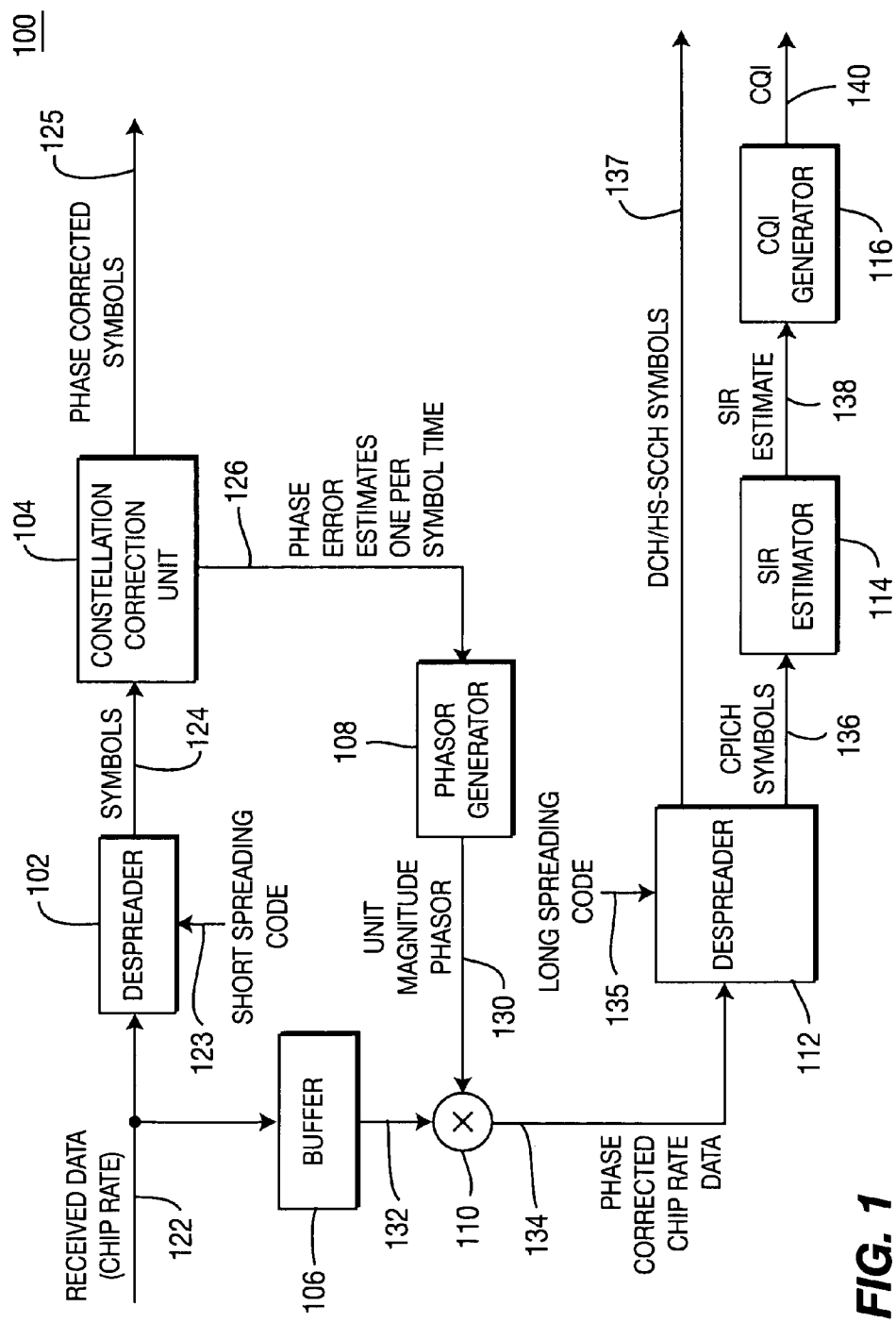
FIG. 1 is a block diagram of a receiver for compensating phase noise for data spread with a long spreading code in accordance with the present invention.

FIG. 1 is a block diagram of a receiver 100 for compensating for phase noise associated with data spread with a long spreading code in accordance with the present invention. The receiver 100 includes a first despreader 102, a constellation correction unit 104, a buffer 106, a phasor generator 108, a multiplier 110, a second despreader 112, an SIR estimator 114 and a CQI generator 116. A first channel transmits data spread with a short spreading code and, simultaneously, a second channel transmits data spread with a long spreading code. The transmitted data is received and processed to generate a chip rate data 122. The chip rate data 122 is fed to the buffer 106 and the first despreader 102. The buffer 106 temporarily stores the chip rate data 122. The first despreader 102 despreads the chip rate data 122 with a short spreading code 123 to generate symbols 124. The first despreader 102 may be an HS-PDSCH despreader for despreading HS-PDSCH transmissions using an SF of 16.

Symbols 124 generated by the first despreader 102 are fed to the constellation correction unit 104. The constellation correction unit 104 corrects gain and phase errors in the constellation prior to mapping symbols 124 into phase corrected symbols 125. The details of the constellation correction unit 104 and the process for correcting the gain and phase errors are described in a U.S. patent application Ser. No. 10/980,692 filed Nov. 3, 2004 entitled "WIRELESS COMMUNICATION METHOD AND APPARATUS FOR PERFORMING POST-DETECTION CONSTELLATION CORRECTION," which is incorporated by reference as if fully set forth.

The phase error estimate 126 of each symbol is calculated from the constellation correction unit 104. The phase error estimates 126 are preferably collected over time to generate a smoothed phase error estimate, which may be generated by filtering the phase error estimates or by performing a polynomial fit to the data. The phase error estimate 126 is fed to the phasor generator 108. The phasor generator 108 generates a unit magnitude phasor 130 to correct the phase error in the chip rate data 122. The unit magnitude phasor 130 is multiplied with buffered chip rate data 132 in the buffer 106 via the multiplier 110 to generate phase corrected chip rate data 134.

The phase corrected chip rate data 134 is sent to the second despreader 112. The second despreader 112 despreads the phase corrected chip rate data 134 with a long spreading code 135. The long spreading code 135 may be any length of spreading codes. For example, the second despreader 112 despreads the phase corrected chip rate data 134 with spreading codes for a CPICH, a dedicated channel (DCH), a high speed-shared control channel (HS-SCCH) (or any other channels) and outputs CPICH symbols 136 and DCH and/or HS-SCCH symbols 137.

The CPICH symbols 136 are fed to the SIR estimator 114 for calculating an SIR estimate 138 on the CPICH. The SIR estimate on the CPICH is fed to the CQI generator 116 for generating a CQI 140.

The phase corrected chip rate data 134 may be re-despread for the short spreading codes iteratively with multiple phase error corrections. Additional short spreading code despreaders, constellation correction units and phasor generators may be added so that the output of the additional despreader may again be used to do more constellation correction, phase error estimates and correction.

Figure 2:
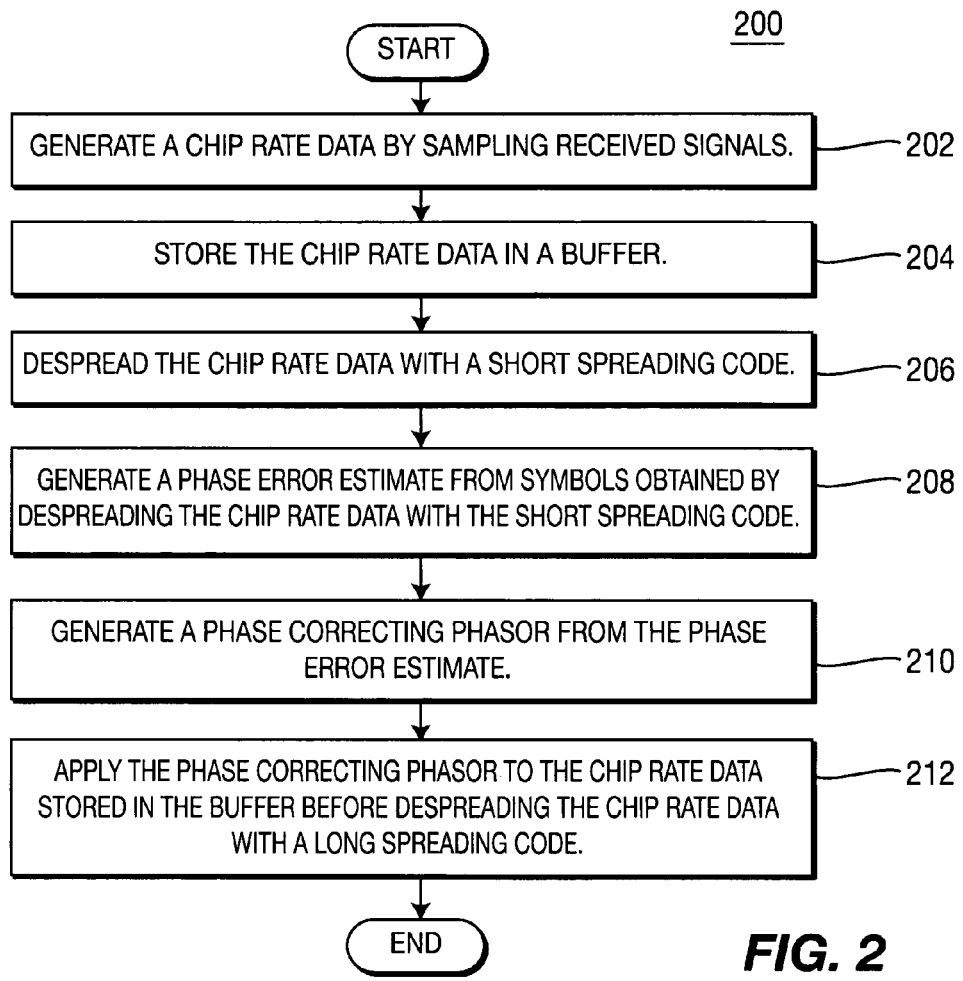
FIG. 2 is a flow diagram of a process for compensating phase noise for data spread with a long spreading code in accordance with the present invention.

FIG. 2 is a flow diagram of a process 200 for compensating phase noise for data spread with a long spreading code in accordance with the present invention. A chip rate data is generated by sampling and descrambling received signals (step 202). The chip rate data is stored in a buffer temporarily (step 204). The chip rate data is despread with a short spreading code (step 206). A phase error estimate is generated from symbols obtained by despreading the chip rate data with the short spreading code (step 208). A phase correcting phasor is then generated from the phase error estimate (step 210). The phase correcting phasor is applied to the chip rate data stored in the buffer before despreading the chip rate data with the long spreading code (step 212).

Figure 3:
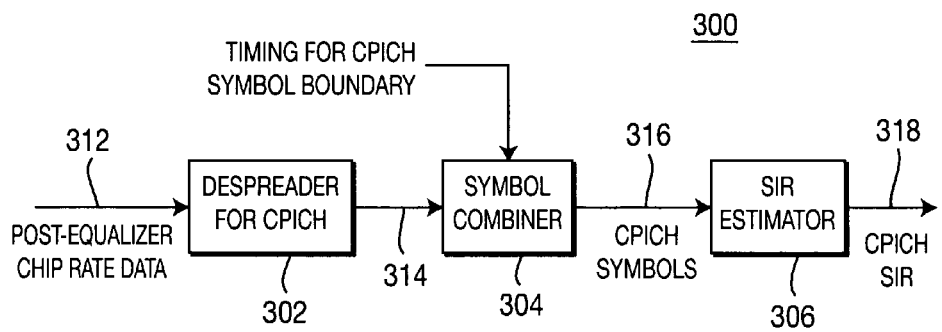
FIG. 3 is a block diagram of an apparatus for compensating phase noise in SIR estimation for long SF symbols in accordance with one embodiment of the present invention.

FIG. 3 is a block diagram of an apparatus 300 for compensating for phase noise in SIR estimation for long SF symbols in accordance with one embodiment of the present invention. The apparatus 300 includes a despreader 302, a symbol combiner 304 and an SIR estimator 306. In order to alleviate the impact of the phase noise on symbols spread with a long spreading code, a shorter spreading code is used to despread the symbols and soft symbols output from the despreader 302 is combined to obtain the long SF symbols. The despreader 302 despreads a post-equalizer chip rate data 312 with a short spreading code and the symbol combiner 304 combines the symbols 314 output from the despreader 302 in accordance with timing for CPICH symbol boundary, which will be explained in detail hereinafter. The combined soft symbols 316 may be sent to the SIR estimator 306 to calculate a CPICH SIR 318.

For example, for the case of 3G FDD, a CQI is generated based on a CPICH SIR estimate. The CPICH SF is 256 and the chip rate is 3.84 Mchips/s. If the SF of 64 is used for de-spreading, then four (4) consecutive soft symbols are combined to estimate the CPICH symbol. A timing signal 320 is provided to the soft symbol combiner 304 such that the soft symbols 314 to be combined are aligned to the CPICH symbol boundary.

For the above example, (a CPICH spreading with an SF=256 code and despreading with an SF=64 code), despreading with a short spreading code and symbol combining are explained hereinafter. $\vec{s} = [s_1 s_2 s_3 s_4]^T$ represents a column vector of soft symbols at the de-spreader output. $\vec{d} = [d_1 d_2 d_3 d_4]^T$ represents a column vector of symbols transmitted for each of the 4 codes with SF=256 derived from the common SF=64 parent code in an OVSF code tree. The common SF=64 parent code corresponds to the OVSF tree branch that the CPICH belongs to. $H_4$ represents a $4^{th}$ order Hadamard matrix.

In the absence of noise, the soft symbols output from the despreader 302 are written as follows:

$$\vec{s} = H_4 \cdot \vec{d}. \qquad \text{Equation (1)}$$

The transmitted symbols are estimated from the despread soft symbols as follows:

$$\vec{d} = H_4^{-1} \cdot \vec{s}. \qquad \text{Equation (2)}$$

Using the well known property of the Hadamard matrix: $H_N \cdot H_N^T = N \cdot I_N$, Equation (2) can be rewritten as follows:

$$\hat{\vec{d}} = \frac{1}{4} \cdot H_4^T \cdot \vec{s}. \qquad \text{Equation (3)}$$

For applications where only the CPICH symbols are of interest, there is no need to perform matrix multiplication. The matrix multiplication can be replaced with a vector dot-product operation.

Figure 4:
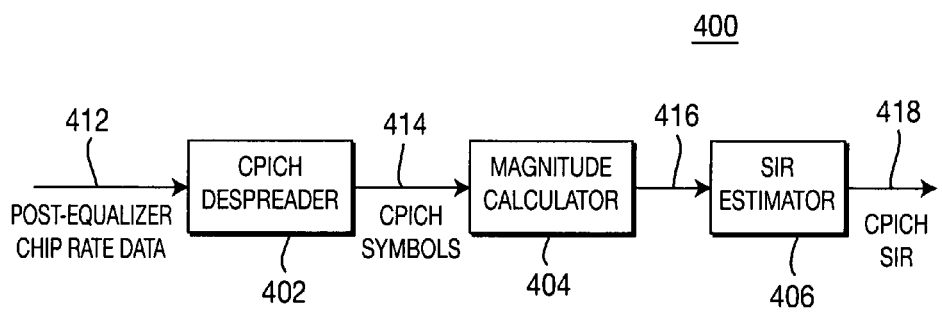
FIG. 4 is a block diagram of an apparatus for compensating phase noise in SIR estimation for long SF symbols in accordance with another embodiment of the present invention.

FIG. 4 is a block diagram of an apparatus 400 for compensating for phase noise in SIR estimation for long SF symbols in accordance with another embodiment of the present invention. The apparatus 400 includes a despreader 402, a magnitude calculator 404 and an SIR estimator 406. Post-equalizer chip rate data is despread with a long spreading code and an SIR estimate is calculated by using the symbol magnitude instead of the complex symbol. The post-equalizer chip rate data 412 is despread by the despreader 402 using the same spreading code used in transmission, (i.e., a long spreading code). The symbols 414 are then fed to the magnitude calculator 404 for calculating magnitude of the symbols. The SIR estimator 406 uses the magnitude values 416 for calculating a CPICH SIR 418.

Figure 5:
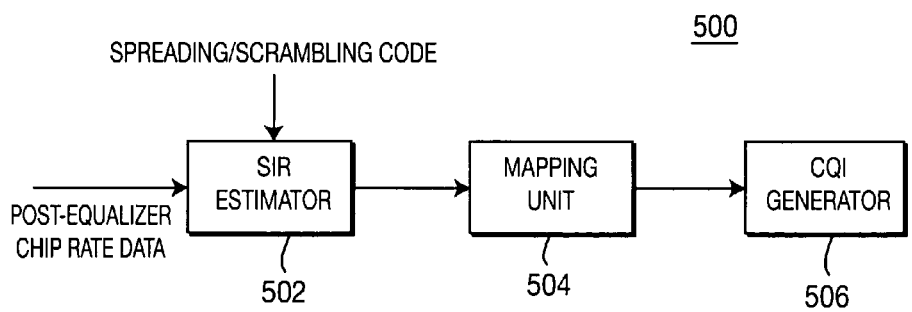
FIG. 5 is a block diagram of an apparatus for compensating phase noise in SIR estimation for long SF symbols in accordance with yet another embodiment of the present invention.

FIG. 5 is a block diagram of an apparatus 500 for compensating phase noise in SIR estimation on a channel using a long spreading code in accordance with yet another embodiment of the present invention. The apparatus 500 includes an SIR estimator 502, a mapping unit 504 and a CQI generator 506. The SIR estimator 502 estimates an SIR on both a channel using a short spreading code and a channel using a long spreading code. The SIR measured on a channel using the long spreading code is then mapped to a compensated SIR by the mapping unit 504. For example, a measured SIR on a CPICH (which uses a long spreading code) is compensated by the channel quality seen by a HS-PDSCH (which uses a short spreading code). The compensated SIR is then mapped to a CQI by the CQI generator 506.

The CPICH SIR mapping is performed in accordance with performance difference anticipated for different SFs in the presence of phase noise or other radio impairments. Different types of radio impairments can be isolated and simulated to quantify the difference in performance of different spreading codes with different SFs. For example, for any given set of radio impairments, simulations can be run for a range of SIR values to measure the degradation of both the CPICH SIR and the HS-PDSCH SIR with respect to the ideal values. The difference between the degradation of the CPICH SIR and the degradation of the HS-PDSCH SIR can then be used to bias the CPICH SIR or the CQI. In this way, the CQI correctly reflects the channel quality experienced by the HS-PDSCH.

Figure 6:
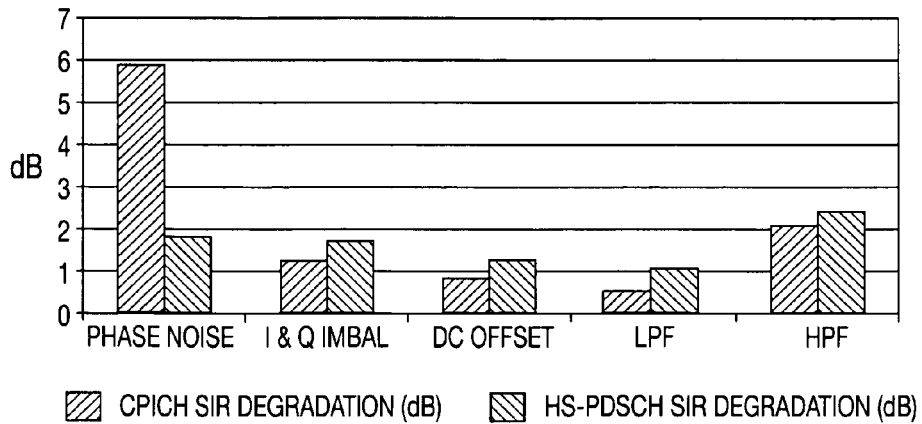
FIG. 6 shows degradation of CPICH SIR and HS-PDSCH SIR in the presence of radio impairments.

Once the difference in performance is quantified, a framework for the compensation can be constructed. An example of how the various radio impairments have different impact on the long SF symbols (e.g., CPICH symbols) versus the short SF symbols (e.g., HS-PDSCH symbols) for a 3G FDD system, is shown in FIG. 6.

The mapping by the mapping unit 504 may be implemented as an equation evaluation or a as a look-up table (LUT). The compensation may be implemented prior to mapping to a CQI, or alternatively, may be applied directly to the CQI generated by an uncompensated CPICH SIR.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for compensating for phase noise of data spread with a long spreading code, the method comprising:
   receiving signals including at least two channels, a first channel including data spread with a short spreading code and a second channel including data spread with the long spreading code;
   generating a chip rate data by sampling the received signals;
   storing the chip rate data;
   despreading the chip rate data with the short spreading code;
   generating a phase error estimate from first channel symbols obtained by despreading the chip rate data with the short spreading code;
   generating a phase correcting phasor from the phase error estimate; and
   applying the phase correcting phasor to the chip rate data stored before despreading the chip rate data with the long spreading code to generate second channel symbols.

2. The method of claim 1 wherein the first channel is a high speed physical downlink shared channel (HS-PDSCH) and the second channel is a common pilot channel (CPICH).

3. The method of claim 2 wherein a signal-to-interference ratio (SIR) is estimated from the second channel CPICH symbols.

4. An apparatus for compensating phase noise for data spread with a long spreading code, the apparatus comprising:
   a receiver configured to receive signals including at least two channels, a first channel including data spread with a short spreading code and a second channel including data spread with the long spreading code;
   a buffer for storing a chip rate data generated by sampling the received signals;
   a first despreader for despreading the chip rate data with the short spreading code;
   a constellation correction unit for generating a phase error estimate from symbols obtained by despreading the chip rate data with the short spreading code;
   a phasor generator for generating a phase correcting phasor from the phase error estimate;
   a multiplier for applying the phase correcting phasor to the chip rate data stored in the buffer; and
   a second despreader for despreading the chip rate data with the long spreading code to generate second channel symbols.

5. The apparatus of claim 4 wherein the first channel is a high speed physical downlink shared channel (HS-PDSCH) and the second channel is a common pilot channel (CPICH).

6. The apparatus of claim 5 further comprising a signal-to-interference ratio (SIR) estimator for estimating an SIR from the second channel CPICH symbols.

7. The apparatus of claim 6 further comprising a channel quality indicator (CQI) mapping unit for generating a CQI from the SIR on the CPICH.

8. A method for compensating phase noise in estimating a signal-to-interference ratio (SIR) on a common pilot channel (CPICH), the method comprising:
   generating a chip rate data from received signals;
   despreading the chip rate data with a spreading code which is a parent code of a spreading code of a CPICH in an orthogonal variable spreading factor (OVSF) code tree to generate multiple intermediate symbols;
   combining the intermediate symbols to generate CPICH symbols; and
   estimating an SIR using the CPICH symbols.

9. The method of claim 8 wherein a timing signal is provided to align the combining of the intermediate symbols to a CPICH symbol boundary.

10. A method for compensating phase noise on estimation of a signal-to-interference ratio (SIR) on a common pilot channel (CPICH), the method comprising:
    generating a chip rate data from received signals;
    despreading the chip rate data with a spreading code of a CPICH to generate CPICH symbols;
    calculating a magnitude of the CPICH symbols; and
    estimating an SIR using the magnitude of the CPICH symbols.

11. An apparatus for compensating phase noise in estimating a signal-to-interference ratio (SIR) on a common pilot channel (CPICH), the apparatus comprising:
    a despreader for despreading a chip rate data generated from received signals with a spreading code which is a parent code of a spreading code of a CPICH in an orthogonal variable spreading factor (OVSF) code tree to generate multiple intermediate symbols;
    a symbol combiner for combining the intermediate symbols to generate CPICH symbols; and
    an SIR estimator for estimating an SIR using the CPICH symbols.

12. The apparatus of claim 11 wherein a timing signal is provided to the symbol combiner to align combining of the intermediate symbols to a CPICH symbol boundary.

13. An apparatus for compensating phase noise on estimation of a signal-to-interference ratio (SIR) on a common pilot channel (CPICH), the apparatus comprising:
    a despreader for despreading a chip rate data generated from received signals with a spreading code of a CPICH to generate CPICH symbols;
    a magnitude calculator for calculating a magnitude of the CPICH symbols; and
    an SIR estimator for estimating an SIR on the CPICH using the magnitude of the CPICH symbols.

14. A method for compensating phase noise in estimating a signal-to-interference ratio (SIR) on a channel including data spread with a long spreading code, the method comprising:
    receiving signals including a first channel, which includes data spread with a short spreading code, and a second channel, which includes data spread with a lone spreading code;
    calculating an SIR on the first channel using the short spreading code used for the first channel;
    calculating an SIR on the second channel using the long spreading code used for the second channel; and
    compensating the SIR on the second channel in accordance with a difference between degradation of the SIR on the first channel and degradation of the SIR on the second channel.

15. The method of claim 14 wherein the first channel is a high speed physical downlink shared channel (HS-PDSCH) and the second channel is a common pilot channel (CPICH).

16. The method of claim 14 wherein the SIR on the second channel is adjusted by using a look-up table (LUT).

17. The method of claim 14 further comprising the generating a channel quality indicator (CQI) from the SIR on the second channel.

18. The method of claim 17 wherein the CQI is adjusted in accordance with the difference between the SIR on the first channel and the SIR of the second channel.

19. An apparatus for compensating phase noise in estimating a signal-to-interference ratio (SIR) on a second channel including data spread with a lone spreading code, the apparatus comprising:
  a receiver configured to receive signals including a first channel, which includes data spread with a short spreading code, and a second channel, which includes data spread with a long spreading code;
  an SIR estimator for calculating an SIR on the first channel using the short spreading code used for the first channel and an SIR on the second channel using the long spreading code used for the second channel; and
  a mapping unit for compensating the SIR on the second channel in accordance with a difference between degradation of the SIR on the first channel and degradation of the SIR on the second channel.

20. The apparatus of claim 19 wherein the first channel is a high speed physical downlink shared channel (HS-PDSCH) and the second channel is a common pilot channel (CPICH).

21. The apparatus of claim 19 wherein the mapping unit uses a look-up table (LUT).

22. The apparatus of claim 19 further comprising a channel quality indicator (CQI) generator for mapping at least one of the SIR on the first channel and the SIR on the second channel to a CQI.

23. The apparatus of claim 22 wherein the CQI is adjusted in accordance with the difference between the degradation of the SIR on the first channel and the degradation of the SIR of the second channel.

24. An integrated circuit (IC) for compensating phase noise for data spread with a long spreading code comprising:
  a receiver configured to receive signals including a first channel, which includes data spread with a short spreading code, and a second channel, which includes data spread with the long spreading code;
  a buffer for storing a chip rate data generated by sampling received signals;
  a first despreader for despreading the chip rate data with the short spreading code;
  a constellation correction unit for generating a phase error estimate from symbols obtained by despreading the chip rate data with the short spreading code;
  a phasor generator for generating a phase correcting phasor from the phase error estimate;
  a multiplier for applying the phase correcting phasor to the chip rate data stored in the buffer; and
  a second despreader for despreading the chip rate data with the long spreading code to generate second channel symbols.

25. The IC of claim 24 wherein the first channel is a high speed physical downlink shared channel (HS-PDSCH) and the second channel is a common pilot channel (CPICH).

26. The IC of claim 25 further comprising a signal-to-interference ratio (SIR) estimator for estimating an SIR from the second channel symbols on the CPICH channel.

27. The IC of claim 26 further comprising a channel quality indicator (CQI) mapping unit for generating a CQI from the SIR on the CPICH.

28. An integrated circuit (IC) for compensating phase noise in estimating a signal-to-interference ratio (SIR) on a common pilot channel (CPICH), the IC comprising:
  a despreader for despreading a chip rate data generated from received signals with a spreading code which is a parent code of a spreading code of a CPICH in an orthogonal variable spreading factor (OVSF) code tree to generate multiple intermediate symbols;
  a symbol combiner for combining the intermediate symbols to generate CPICH symbols; and
  an SIR estimator for estimating an SIR with the CPICH symbols.

29. The IC of claim 28 wherein a timing signal is provided to the symbol combiner to align combining of the intermediate symbols to a CPICH symbol boundary.

30. An integrated circuit (IC) for compensating phase noise on estimation of a signal-to-interference ratio (SIR) on a common pilot channel (CPICH), the IC comprising:
  a despreader for despreading a chip rate data generated from received signals with a spreading code of a CPICH to generate CPICH symbols;
  a magnitude calculator for calculating a magnitude of the CPICH symbols; and
  an SIR estimator for estimating an SIR on the CPICH using the magnitude of the CPICH symbols.

31. An integrated circuit (IC) for compensating phase noise in estimating a signal-to-interference ratio (SIR) on a channel including data spread with a long spreading code, the IC comprising:
  a receiver configured to receive signals including a first channel, which includes data spread with a short spreading code, and a second channel, which includes data spread with a long spreading code;
  an SIR estimator for calculating an SIR estimate on a first channel using a short spreading code used for the first channel and an SIR estimate on a second channel using a long spreading code used for the second channel; and
  a mapping unit for compensating the SIR estimate on the second channel in accordance with a difference between degradation of the SIR estimate on the first channel and degradation of the SIR estimate on the second channel.

32. The IC of claim 31 wherein the first channel is a high speed physical downlink shared channel (HS-PDSCH) and the second channel is a common pilot channel (CPICH).

33. The IC of claim 31 wherein the mapping unit uses a look-up table (LUT).

34. The IC of claim 31 further comprising a channel quality indicator (CQI) generator for mapping at least one of the SIR estimate on the first channel and the SIR estimate on the second channel to a CQI.

35. The IC of claim 34 wherein the CQI is adjusted in accordance with the difference between the SIR estimate on the first channel and the SIR estimate one the second channel.

* * * * *